United States Patent [19]

Niwa

[11] Patent Number: 5,371,873
[45] Date of Patent: Dec. 6, 1994

[54] IMAGE DATA PROCESSING TERMINAL EQUIPMENT COUPLED TO AN EXTERNAL DEVICE ALLOWING INDEPENDENT USE OF MEMORY AREA BY THE EXTERNAL DEVICE

[75] Inventor: Yuichi Niwa, Yokohama, Japan

[73] Assignee: Ricoh Company, Ltd., Tokyo, Japan

[21] Appl. No.: 542,191

[22] Filed: Jun. 21, 1990

[30] Foreign Application Priority Data

Jun. 22, 1989 [JP] Japan ................... 1-160339

[51] Int. Cl.$^5$ ............................................. G06F 12/02
[52] U.S. Cl. ................... 395/425; 364/256.4; 364/235; 364/246.3; 364/246; 364/DIG. 1; 395/800
[58] Field of Search ............... 395/116, 425, 115, 800

[56] References Cited

U.S. PATENT DOCUMENTS

| | | | |
|---|---|---|---|
| 4,430,649 | 2/1984 | Leininger | 341/731 |
| 4,660,999 | 4/1987 | Tsuneki | 400/61 |
| 4,695,976 | 9/1987 | Nakanishi | 364/900 |
| 4,979,131 | 12/1990 | Suzuki | 395/116 |
| 4,989,163 | 1/1991 | Kawamata | 395/106 |
| 5,038,298 | 8/1991 | Matsumoto | 395/148 |
| 5,129,085 | 7/1992 | Yamasaki | 395/650 |
| 5,146,545 | 9/1992 | Maruyama | 395/115 |
| 5,150,454 | 9/1992 | Wood | 395/114 |

*Primary Examiner*—Eric Coleman
*Attorney, Agent, or Firm*—Cooper & Dunham

[57] ABSTRACT

An image data processing terminal equipment coupled to an external device includes a data processing part for carrying out a predetermined data process for data, and a communication part for transferring data between the data processing terminal equipment and the external device. The terminal equipment also includes a memory for storing data, and a data write part for writing data supplied, through the communication part, from the external device into the memory part in accordance with a write command produced and output by the external device. Further, the terminal equipment includes a data read out part for reading out the data from the memory part and for supplying the data to the external device through the communication part in accordance with a read command produced and output by the external device.

16 Claims, 4 Drawing Sheets

IMAGE DATA PROCESSING TERMINAL EQUIPMENT COUPLED TO AN EXTERNAL DEVICE ALLOWING INDEPENDENT USE OF MEMORY AREA BY THE EXTERNAL DEVICE

BACKGROUND OF THE INVENTION

The present invention generally relates to computer peripheral devices coupled to a host computer, and more particularly to an image data processing terminal equipment, such as a printer, an image scanner, a modem (modulator and demodulator) or the like.

There are previously known, as peripheral devices of a host computer, a printer, an image scanner, or a modem. The printer is supplied with information which is processed and output by the host computer, and prints out characters and/or graphics based on the supplied information. The image scanner optically reads a document and outputs a corresponding electrical signal to the host computer. The facsimile machine is supplied with information related to an original which is to be sent to a destination terminal, and outputs the same to a communication line.

Some peripheral devices have a large-capacity storage device and/or a plurality of different data processing functions. For example, a page printer such as a liquid printer or a laser beam printer is presently widely used. Such a page printer is equipped with a large-capacity RAM (random access memory) since an image amounting to one page must be formed in a storage area. A page printer which has a storage capacity enabling images equal to a plural number of pages to be stored simultaneously is also available. Such a page printer can operate at higher speeds and realize a duplex print. Some available printers can be connected to not only an extended RAM but also an extended hard disk drive unit, such as a magnetic disk unit. Conventional hard disk units have the ability to store fonts and initial commands which are used when the power supply to the printers is started.

It will be noted that the host computer cannot use the storage area provided by the extended RAM or extended hard disk unit. The storage capacity available in the printer tends to be increased. However, the storage area in the printer is used by the printer only when a print request command, which is, in general, temporarily generated, occurs. In addition, it is impossible for the host computer to use the storage area provided in the printer. Thus, the storage area in the printer is not used economically. Of course, extended RAMs or hard disk units themselves are expensive.

Further, conventional systems having a host computer and a printer are not designed to read out predetermined data from the storage area in the printer after the predetermined data is written therein. For example, it is impossible to read out down load font (font data), forms overlay data (print format data) and micro commands from the printer after the data are written therein.

Page printers are required to perform an image processing at high speeds and thus have high performance hardware and software which is often equivalent or superior to that of a personal computer, which serves as the host computer. However, the high-performace hardware and software work only when the printer is performing the image processing, and is thus idling when the printer is not carrying out the image processing.

As has been described previously, image scanners function as the peripheral devices of the host computer. Some image scanners have hardware which implements an image processing such as a data compression process. However, it is possible for peripheral devices other than the image scanner to utilize such an image processing implemented by the image scanner.

Some facsimile machines or modems have a data compression/decompression procedure and/or a data scrambling/descrambling procedure. However, it is impossible for other peripheral devices to use such procedures.

SUMMARY OF THE INVENTION

It is a general object of the present invention to provide an image data processing terminal equipment, in which the above-mentioned disadvantages are eliminated.

A more specific object of the present invention is to provide an image data processing terminal equipment which enables a host computer or another terminal equipment to use various functions of the terminal equipment.

The above-mentioned objects of the present invention are achieved by an image data processing terminal equipment coupled to an external device, the image data processing terminal equipment comprising:

data processing means for carrying out a predetermined procedure for data;

communication means, coupled to the data processing means, for transferring data between the data processing terminal equipment and the external device;

memory means, coupled to the data processing means and the communication means, for storing data;

data writing means, coupled to the communication means and the data processing means, for writing data supplied, through the communication means, from the external device into the memory means in accordance with a write command produced and output by the external device; and data read out means, coupled to the communication means and the memory means, for reading out the data from the memory means and for supplying the data to the external device through the communication means in accordance with a read command produced and output by the external device.

The aforementioned objects of the present invention are also achieved by an image data processing terminal equipment coupled to an external device, the image data processing terminal equipment comprising:

communication means, coupled to the data processing means, for transferring data between the data processing terminal equipment and the external device;

data processing means for generating video data from the data supplied from the external device through the communication means;

memory means, coupled to the data processing means and the communication means, for storing the video data;

data writing means, coupled to the communication means and the data processing means, for writing the video data generated and output by the data processing means into the memory means;

data read out means, coupled to the communication means and the memory means, for reading out the video data from the memory means and for supplying the image data to the external device through the communication means;

print means, coupled to the memory means, for printing an image formed by the video data on a recording media; and control means, coupled to the data processing means, the data communication means, the memory means and the print means, for receiving a command produced and output by the external device and for selectively connecting the external device to either the memory means, the print means or the communication means in accordance with the command.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENT

Figure 1:
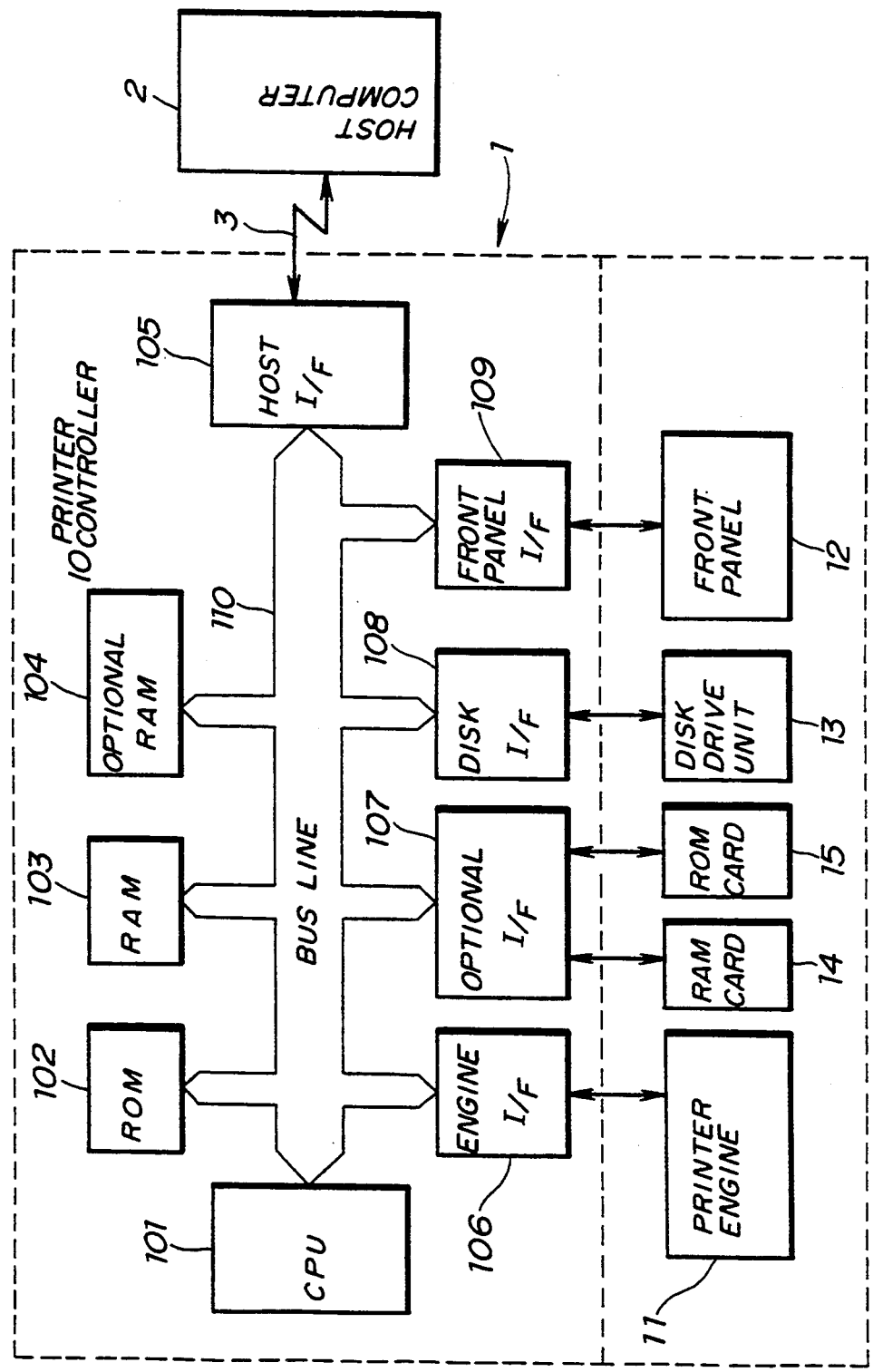
FIG. 1 is a block diagram of a functional structure of a preferred embodiment of the present invention.

A description will now be given of a preferred embodiment of the present invention. Referring to FIG. 1, there is illustrated a control system of a laser beam printer, which functions as a peripheral device of a host computer. A laser beam printer 1 is connected to a host computer 2 through a host interface cable 3. The laser beam printer 1 is composed of a printer controller 10, a printer engine 11, a front panel 12, a disk drive unit 13, a RAM card 14 and a ROM (read only memory) card 15. The printer controller 10 controls the entire operation of the laser beam printer 1. The printer engine 11 has the function of printing an image on a media, such as paper or film, under the control of the printer controller 10. The front panel 12 is used for inputting various data and instructions. The front panel 12 has a display unit, which is used to display various information. The disk drive unit 13 functions as a large storage capacity memory device and is formed of a magnetic hard disk drive or a magnetic floppy disk drive. The RAM card 14 and the ROM card 15 are optional elements.

The printer controller 10 is made up of a microcomputer or a central processing unit (hereinafter simply referred to as a CPU) 101, a ROM 102, a RAM 103, an optional RAM 104, and bidirectional interface circuits 105, 106, 107, 108 and 109 and a set of bus lines 110 (hereinafter simply referred to as a bus 110). The ROM 102 and RAM 103 are internal memories of the printer controller 10. The optional RAM 104 is an extended memory of the printer controller 10. The interface circuit 105 is a host interface circuit, which interfaces with the host computer 2. The host interface circuit 105 has a parallel interface and a serial interface, which are selectively used in accordance with the type of the host computer 2. The interface circuit 106 is an engine interface circuit, which interfaces with the printer engine 11.

The interface circuit 107 is an optional interface circuit, which interfaces with the RAM card 14 and the ROM card 15. The interface circuit 108 is a disk interface circuit, which interfaces with the disk drive unit 13. The interface circuit 12 is a front panel interface circuit, which interfaces with the front panel 12. The bus 110 mutually connects the structural elements of the printer controller 10.

The CPU 101 controls the entire operation of the printer controller 10, and is formed of, for example, a 16-bit or 32-bit microcomputer. The ROM 102 stores various programs which define operations of the the CPU 101. The RAM 103 is a large-capacity RAM, and functions as a working area of the CPU 101, a page buffer area and a host storage area assigned to the host computer 2. The working area of the RAM 103 includes an input buffer, which stores data, such as character codes and control codes which are transferred from the host computer 2. The page buffer area of the RAM 103 is used when video data (bit map image data) in a page unit is derived from the data in the input buffer by using the font data in the ROM 102. The host storage area stores the data supplied from the host computer 2 or the other computer peripheral devices following the data write command. The optional RAM 104 is a RAM module or a RAM board. The optional RAM 104 is used where necessary, and is used in the same way as the RAM 103. Some of the above-mentioned structural elements are further described in U.S. patent application Ser. No. 393,692 now U.S. Pat. No. 4,980,780, the disclosure of which is hereby incorporated by reference.

Figure 2:
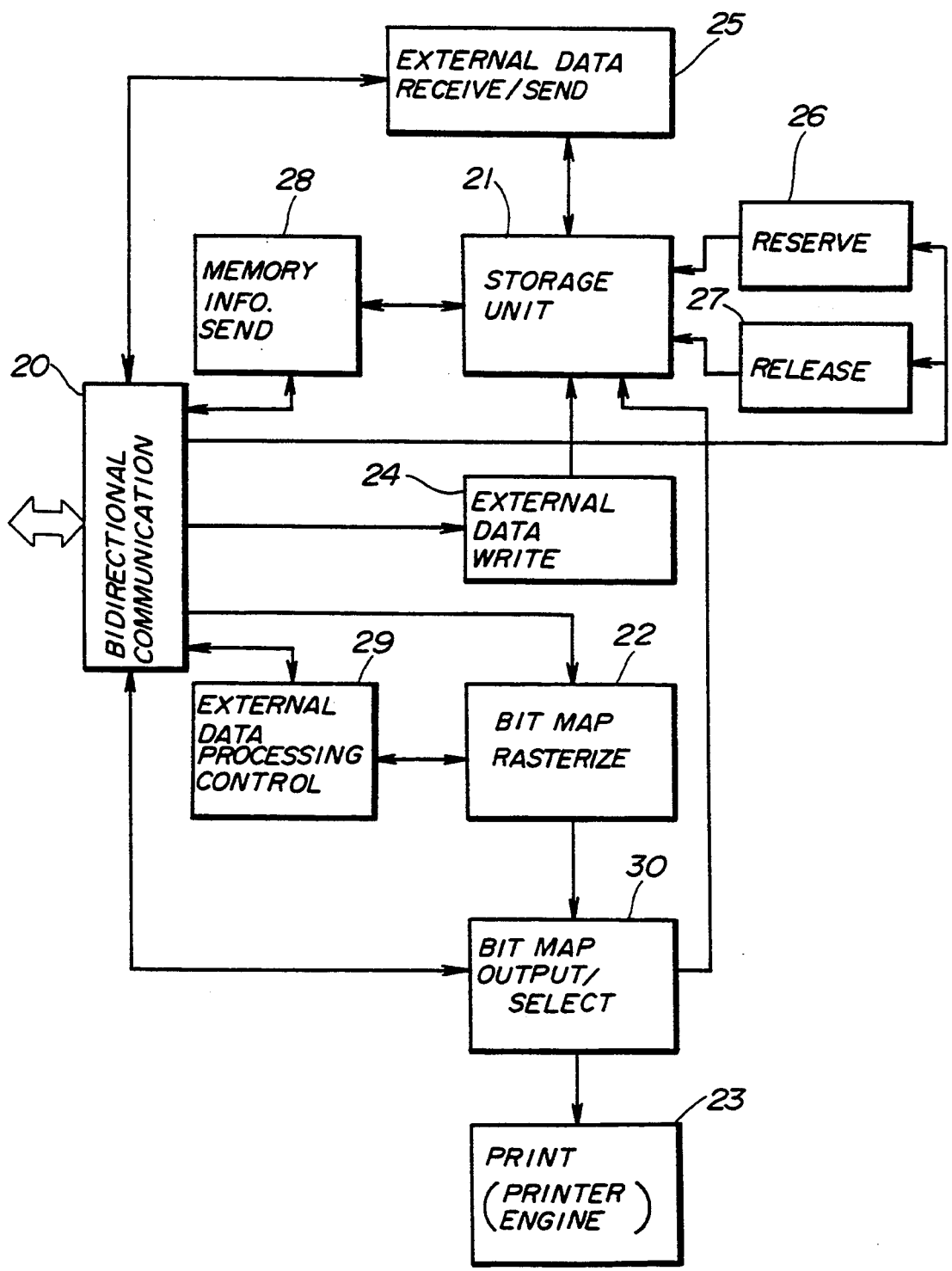
FIG. 2 is a block diagram of a hardware structure of a laser beam printer having the functional structure shown in FIG. 1.

FIG. 2 is a block diagram of a functional structure of the laser beam printer 1. The laser beam printer shown in FIG. 2 includes a bidirectional communication circuit 20, a storage unit 21, a bit map processing circuit 22 (which functions as a data processing circuit) and a printing device 23. The bidirectional communication circuit 20 corresponds to the interface circuits 106–109 shown in FIG. 1. The storage unit 21 corresponds to the ROM 102, the RAM 103 and the disk drive unit 13. The printing device 23 corresponds to the printer engine 11.

The laser beam printer shown in FIG. 2 also includes an external data writing circuit 24 and an external data receive/send circuit 25, which are implemented by the CPU 101. The external data writing circuit 24 writes data which is transmitted, through the bidirectional communication circuit 20, from the host computer 2 or the other computer peripheral devices into the storage unit 21 in accordance with instructions transmitted therefrom. The external data receive/send circuit 25 reads out data from the storage unit and sends the same to the host computer 2 or the other computer peripheral devices through the bidirectional communication circuit 20 in accordance with instructions transmitted therefrom.

Further, the laser beam printer 1 includes an area reserve circuit 26, an area release circuit 27 and a memory information output circuit 28, all of which are implemented by the CPU 101. The area reserving circuit 26 reserves a part of the storage area in the storage unit 21 for use of the host computer 2 or the other computer peripheral devices. An area release circuit 27 releases the assigned area. The memory information output circuit 28 sends memory information about the type and available capacity of the storage unit 21, the capacity of a part of the storage area assigned to the host computer 2 and the other peripheral devices and the capacity of a busy area of the part of the storage area assigned thereto.

Moreover, the laser beam printer 1 includes an external data processing controller 29 and a bit map output/select circuit 30, both of which are implemented by the CPU 101. The external data processing controller 29 has the bit map processing circuit 22 generate a bit map of data output by the host computer 2 through the bidirectional communication circuit 20, and sends the generated bit map image data to the host computer 2 through the bidirectional communication circuit 20. The bit map output/select circuit 30 selectively carries out the following three data procedures for the bit map image data produced and output by the bit map processing circuit 22. The first procedure is to write the bit map image data into the storage unit 21 in accordance with an instruction from the host computer 2. The second procedure is to send the bit map image data to the printing device 23 so that a corresponding image is printed on a sheet. The third procedure is to send back the bit map image data to the host computer 2.

A description will now be given of the operation of the laser beam printer shown in FIGS. 1 and 2 with reference to FIGS. 3 and 4. Data produced and output by the host computer 2 is received by the CPU 101 through the host interface circuit 105 (step 201). The CPU 101 determines, at step 202, whether or not the received data is related to a print character or an escape character (ESC11 1BH) in accordance with a corresponding program stored in the ROM 102. When it is determined that the received data is not related to the escape character, the CPU 101 determines that the received data is related to print data. Then the CPU 101 produces a bit map image of the received data in a storage area in the RAM 103 or the optional RAM 104. Then the CPU 101 performs a character print process including movement of the printing position.

Figure 4:
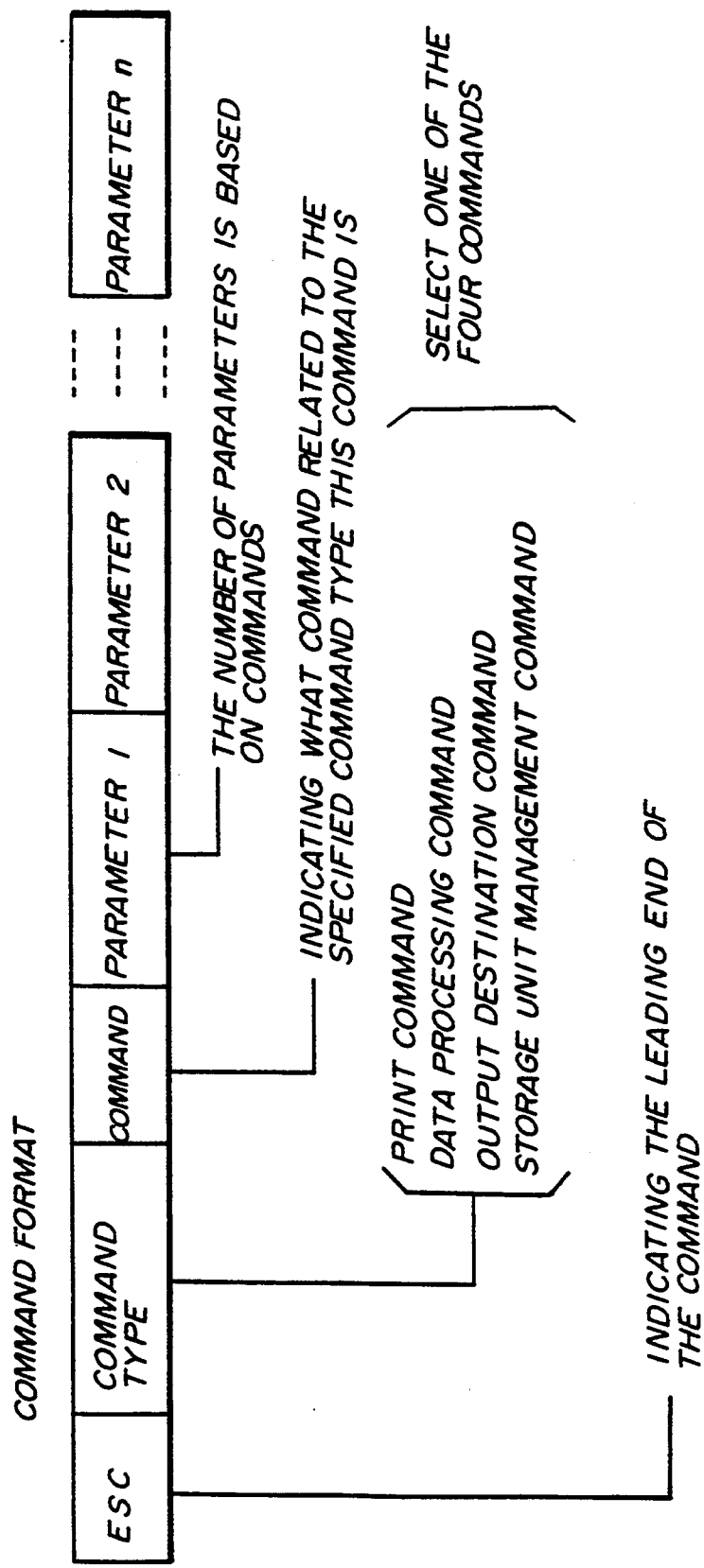
FIG. 4 is a diagram illustrating a command format used in the laser beam printer shown in FIG. 2.

On the other hand, when the received data is related to an escape character (ESC), the CPU 101 makes a decision that a command having a basic command format shown in FIG. 4 will be received. Then, the CPU 101 receives next data (related to the type of command) at step 203, and determines what command type the received command is (step 205). The commands used in the laser beam printer 1 are classified into a print command, a data process command, an output destination specifying command and a storage unit management command. The CPU 101 provides appropriate processes for the types of commands. The CPU 101 selects one of the processes and executes the same.

A description will now be given of a processing procedure which is related to the print command and executed at step 206. When the received data is a print command, such as a bold print start/end command or an underline start/end command, the CPU 101 carries out a procedure for setting a bold flag or an underline flag to ON/OFF so that the specified printing operation can be executed. When the print command is a page output command, the CPU 101 executes a procedure for reading out bit map image data from in the RAM 103 or the optional RAM 104 and for sending the same to the printer engine 11 through the engine interface circuit 106. Upon receiving the received bit map image data, the printer engine 11 prints the same on a media, such as paper or film. Then, the CPU 101 prepares to receive the next data from the host computer 2 in order to form the next page and then awaits the same. The aforementioned character printing procedure and the procedure of the print command process described above are conventional procedures in the laser beam printer 1. If the received data is a command other than data related to an image which is to be printed and the print command, the CPU 101 executes one of the following procedures in accordance with the type of command.

When the CPU 101 recognizes the received data to be a data processing type command, the CPU 101 starts to execute the procedure defined by the data procedure command and selectively performs the following procedures on the basis of the type of command portion subsequent to a data processing command flag (ESC) shown in FIG. 4.

When the CPU 101 recognizes the received data to be a data write command by referring to the command part of the received command thereof, the CPU 101 receives the data name, the data length and other information, and recognizes subsequent data to be written into the storage unit 21 formed of the RAM 103, 104 and/or the disk drive unit 13.

When the received data is recognized to be a data read command from the received command thereof, the CPU 101 receives the data name, data length, index data and other information of the received command. Then, the CPU 101 reads out data by the received data length, starting from a portion specified by the index data related to data specified by the data name, and sends back the readout data to the host computer 2.

When the received data is recognized, from the command part thereof, to be a data delete command, the CPU 101 deletes data specified by the data name of the received data delete command from the storage device 21.

When the received data is recognized, from the command part thereof, to be a data name change command, the data name and a new data name are read out from the received data, and the data name is replaced with the new data name.

When the received data is recognized, from the command part thereof, to be a data copy command, the data name and a new data name are read out from the received data, and the related data is arranged so that it can be accessed by not only the present data name but also the new data name.

When the received data is recognized, from the command part thereof, to be a data name list output command, a list of data names of data which are supplied from the host computer 2 and stored in the storage unit 21 is sent back to the host computer 2.

When the received data is recognized, from the command part thereof, to be a data processing command, at step 207, the CPU 101 receives the data name and a processing algorithm thereof contained in the received data. Then, the CPU 101 processes data registered in the received data name in accordance with the received processing algorithm, and registers processed data in the storage unit 21 of the laser beam printer 1. It will be noted that the data processing executed at step 207 includes an image processing, an expansion/reduction processing, a data compression/decompression processing, an extension processing and a rotation processing.

When the received data is recognized, from the command part thereof, to be a processing algorithm registration command, the CPU 101 receives a processing name and a processing algorithm in the received data, and registers the processing algorithm in the processing name provided in the storage unit 21.

When the received data is recognized, from the command part thereof, to be a processing algorithm delete command, the CPU 101 receives a processing name in the received data, and deletes the processing algorithm specified by the received processing name from the storage unit 21 so that the processing addressed to the deleted processing algorithm produces no results and-/or generates an error.

When the received data is recognized, from the command part thereof, to be an automatic processing instruction, the CPU 101 receives a data name pattern and a processing name in the received data. Then, the CPU 101 registers, as an automatic processing procedure, the data pattern and a processing specified by the processing name in the storage unit 21. It will be noted that "pattern" may include one ore more of "wild characters", like mark "*" (which means that an arbitrary number of characters is replaceable) and "?" (which means that an arbitrary character may be substituted) which can be used when specifying the file name in the MS-DOS, or a regular expression used in the UNIX.

After the above-mentioned automatic processing procedure is registered, data which is supplied from the host computer 2 and is to be registered in a data name suitable for the registered pattern is processed in accordance with the processing algorithm registered in the processing name automatically registered, and is then stored in the storage unit 21 or printed by the printer engine 23.

When the received data is recognized, from the command part thereof, to be the automatic processing delete command, the CPU 101 receives a data name pattern contained therein. Then, the CPU 101 deletes the registration of the automatic processing procedure related to this data name pattern. Thereby, even if the host computer 2 stores data which conforms to the received data name pattern in the storage unit 21 in the laser beam printer 1, or prints to the laser beam printer 1, the data is not processed in accordance with the previously defined algorithm any more.

When the received data is recognized, from the command part thereof, to be an automatic processing list, the CPU 101 returns the list of data name patterns and processing names of the registered automatic processing to the host computer 2.

When the received data is recognized, from the command part thereof, to be an automatic printing command, the CPU 101 receives a data name pattern in the received command and registers, as an automatic print processing pattern, the received data name pattern in the storage unit 21 of the laser beam printer 1. After registering the automatic print processing pattern, data which is supplied from the host computer 2 with the data name that matches the registered pattern is written into the storage unit 21 of the laser beam printer 1, and is then printed automatically.

When the received data is recognized, from the received part thereof, to be an automatic print cancel command, the CPU 101 receives a data name pattern included in the received command, and cancels the registration of the automatic print processing matching the received data name pattern. Thereby, even when data having the data name related to the data name pattern in the received command is written into the storage unit 21 of the laser beam printer 1, the automatic printing operation is not executed.

When the received data is recognized, from the command part thereof, to be an automatic print pattern list command, the CPU 101 sends all registered data name patterns for automatic printing to the host computer 2.

When the received data is recognized, from the command part thereof, to be a buffer-and-print command, the CPU 101 receives a data name pattern in the received command, and registers it for buffer-and-print in the storage unit 21 of the laser beam printer 1. After registering the buffer-and-print command, data which is supplied from the host computer 2 and which is to be written in the data name matching the registered pattern is temporarily written into the storage unit 21 of the laser beam printer 1 and is then printed. After the printing operation is completed, the data is deleted from the storage unit 21.

When the received data is recognized, from the command part thereof, to be a "cancel buffer-and-print" command, the CPU 101 receives a data name pattern from the received command and deletes a non-registered automatic print processing pattern matching the received data name pattern. Even if data having the registered data name pattern is written into the storage unit 21, the buffer-and-print operation is not carried out.

When the received data is recognized, from the command part thereof, to be a buffer-and-print pattern list command, the CPU 101 sends the list of name patterns registered for buffer-and-print to the host computer 2.

When the received data is recognized, from the command part thereof, to be a macro setting command, the CPU 101 receives a macro name and a macro procedure (which is allowed to define an arbitrary procedure related to pattern, character, command or the like). Then, the CPU 101 registers a macro procedure related to the macro name in the received command in the storage unit 21 of the laser beam printer 1. If the macro command registered in the storage unit 21 is recognized in the future, the macro procedure registered in the name of the recognized macro command is performed.

When the received data is recognized, from the command part thereof, to be a macro delete command, the CPU 101 receives a macro name from the received command and deletes the macro procedure related to the macro name from the storage unit 21 of the laser beam printer 1. Thereby, even if the present macro command is received, it is not executed.

When the received data is recognized, from the command part thereof, to be a simple macro list command, the CPU 101 sends all macro names registered in the storage unit 21 to the host computer 2.

When the received data is recognized, from the command part thereof, to be a complete macro list command, the CPU 101 sends all macro names and related macro procedures which are registered in the storage unit 21 to the host computer 2.

Figure 3:
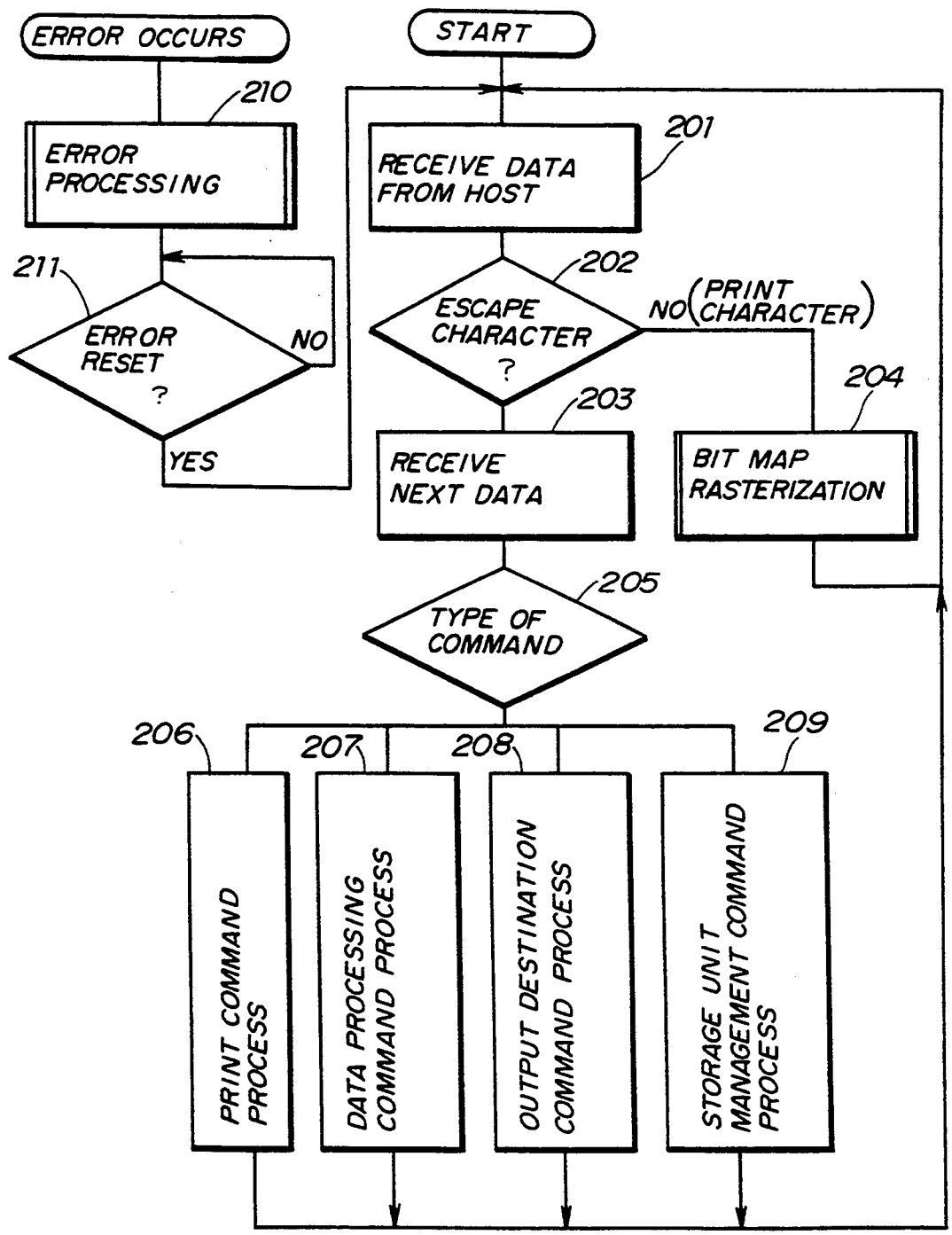
FIG. 3 is a flowchart illustrating the operation of the laser beam printer shown in FIG. 2.

When the command type area of the command format shown in FIG. 4 indicates an output destination specifying command, the control procedure shown in FIG. 3 starts to execute an output destination specifying command procedure defined at step 208. In the procedure at step 208, the following processes can be carried out in accordance with data in the command area of the basis command format shown in FIG. 4.

When the received data is recognized, from the command part thereof, to be a storage unit output command, the CPU 101 receives a data name from the received command, and sets the data output destination to be the storage unit 21. After this, whenever the printer controller 10 executes the page output command, bit map image data in the RAM 103 or 104 is not transferred to the printer engine 11, but is instead written therein so that the host computer 2 can read out data by specifying the data name.

When the received data is recognized, from the command part thereof, to be a host output command, the CPU 101 sets the data output destination to be the host computer 2. After this command, whenever the printer controller 10 executes the page output command, bit map image in the RAM 103 or 104 is not transferred to the printer engine 11, but instead to the host computer 2.

When the received data is recognized, from the command part thereof, to be a paper output command, the CPU 101 sets the data output destination to be the printer engine 11. After this, whenever the printer controller 10 executes the page output command, bit map image data in the RAM 103 or 104 is transferred to the printer engine 11 through the engine interface circuit 106.

When the command type area of the basic command format indicates a storage unit management command type, the CPU 101 executes a storage unit management command procedure at step 209. The procedure at step 209 is carried out as follows.

When the received data is recognized, from the command part thereof, to be an available memory report command, the CPU 101 sends the host computer 2 memory information about the type of storage unit in the laser beam printer 1 (RAM, hard disk and/or floppy disk), the storage capacity of each storage unit, the storage capacity reserved for the host computer 2, the storage capacity which is already used by the host computer 2, and the storage capacity which is not yet used by the host computer 2.

When the received data is recognized, from the command part thereof, to be a reserve memory command, the CPU 101 receives a memory capacity from the received data, and reserves the host computer 2 a storage area corresponding to the specified memory capacity. Thereby, the host computer 2 is allowed to use the reserved storage area in the storage unit.

When the received data is recognized, from the command part thereof, to be a host memory reset command, the CPU 101 releases all storage areas in the storage unit 21 reserved for the host computer 2. Thereby, data in all of the released storage areas is erased.

A description will now be given of an error process which is executed at step 210 shown in FIG. 3. In a case where the above-mentioned commands cannot be executed correctly due to a certain cause or incorrect execution results are output, an error occurs. In this case, the CPU 101 sends an error message and/or an error signal indicative of the type of error and the cause thereof to the host computer 2 and displays an appropriate error message on the LCE panel on the front panel 12. Then, the CPU 101 continues to neglect received data until it receives an error clear signal or an error clear command from the host computer 2. Upon receiving the error clear signal or the error clear command, the CPU 101 operates in the normal operation mode.

In a case where a magnetic storage unit is built in the laser beam printer 1, it is possible to record the occurrence and cause of errors in a format which enables the host computer 2 to easily read it. Further, printer management is facilitated by recording information about the status of the laser beam printer 1, the number of print pages, the user name and the host name on a nonvolatile memory, such as a magnetic storage memory.

According to the above-mentioned embodiment of the present invention, the following advantages are obtained.

When the host computer 2 needs to temporarily store data, it is possible for the host computer 2 to write the data into the storage unit 21 in the laser beam printer 1. It is possible for the laser beam printer 1 to execute various commands by defining algorithms directed to converting print commands which are described in different formats into a format which the laser beam printer 1 can understand. It is also possible for the laser beam printer 1 to execute print commands described in different formats without using a switch operation by means of a switch by defining algorithms directed to converting print commands in the different formats into a format which the laser beam printer 1 can understand and by processing data related to the print formats by the use of the aforementioned data name patterns.

When the buffer-and-print is set, data is stored in the storage unit 21 before it is printed. It is possible to store data at a speed which is much greater than the speed at which the data is printed. Thus, the laser beam printer 1 can receive data at a speed which is higher than speed with which the laser beam printer 1 directly executes the printing operation. As a result, it is possible to reduce the time it takes the host computer 2 to execute the procedure related to the printing operation and thus operate the host computer 2 more effectively.

When the automatic printing operation is set, it is possible to simultaneously execute the printing operation and the data transfer operation at reduced times, as in the case of the non-registered automatic print. The use of the macro command makes it possible to simplify complex procedures, such as data processing, printing and the canceling operation. By using the host output command or the storage unit output command, it is possible for the host computer 2 or the storage unit 21 to obtain bit map image data which indicates graphics drawn by the print command.

By using the storage unit print command, it is possible for the host computer 2 to execute another job while having the laser beam printer 1 generate bit map image data. Thus, it is possible for the host computer 2 to read out the bit map image data from the storage unit 21 in the laser beam printer 1 after it finishes the outstanding job. By using the storage unit management command, it is possible to know the status of the storage unit and thus use the same more effectively. The investigation of the causes of an error is facilitated since it is possible to read the record of the occurrence of errors after the errors are eliminated. Printer management is facilitated by using the record which indicates who used the printer 1.

The above-mentioned embodiment of the present invention is directed to a laser beam printer. However, the present invention can be applied to other computer peripheral devices, such as a scanner, a modem, a digital copying machine and an intelligent facsimile machine. In a case where the host computer uses the data compression function of the scanner, the scanner is designed to have a procedure for storing data, compressing the data, storing compressed data, reading out the compressed data and sending the same to the host computer.

The present invention is not limited to the specifically disclosed embodiment, and variations and modifications may be made without departing from the scope of the present invention.

What is claimed is:

1. An image data processing terminal equipment coupled to an external device, said image data processing terminal equipment comprising:

data processing means, for carrying out a predetermined data process for data;

communication means, coupled to said data processing means, for transferring data between said data processing terminal equipment and said external device;

memory means, coupled to said data processing means and said communication means, for storing data;

data writing means, coupled to said communication means and said data processing means, for writing data supplied, through said communication means, from said external device into said memory means in accordance with a write command produced and output by said external device;

data read out means, coupled to said communication means and said memory means, for reading out said data supplied from said external device from said memory means and for supplying said data to said external device through said communication means in accordance with a read command produced and output by said external device;

area reserving means, coupled to said communication means and said memory means, for receiving a first command produced and output by said external device through said communication means, said first command requesting the memory means to directly reserve a storage area of said memory means, and for reserving a limited storage area of said memory means so that said external device can secure the storage area of the memory means for use independently of the predetermined data process carried out by the data processing means; and area releasing means, coupled to said communication means and said memory means, for receiving a second command produced and output by said external device through said communication means, said second command directly releasing said storage area of said memory means in response to said second command, wherein said data writing means writes said data supplied from said external device into said storage area of said memory means reserved by said area reserving means in response to said first command.

2. An image data processing terminal equipment as claimed in claim 1, further comprising memory information output means, coupled to said memory means and said communication means, for managing the status of said memory means and for outputting memory information about said memory means, said memory information including at least a capacity of said storage area reserved by said area of reserving means, a capacity of a busy area of said storage area to said external device and a capacity of said reserved storage area which is not yet used by said external device, through said communication means.

3. An image data processing terminal equipment as claimed in claim 1, further comprising control means, coupled to said data processing means and said communication means, for controlling said data processing means so that said data processing means carries out said predetermined data process of the data which is produced and output by said external device, and so that data produced by said predetermined data process is supplied to said external device through said communication means.

4. An image data processing terminal equipment as claimed in claim 1 wherein said data writing means comprises means for writing said data supplied from said data processing means into said memory means.

5. An image data processing terminal equipment as claimed in claim 1 wherein said memory means comprises a random access memory built in said data processing terminal equipment.

6. An image data processing terminal equipment as claimed in claim 1 wherein said memory means comprises a random access memory.

7. An image data processing terminal equipment as claimed in claim 1 wherein said memory means comprises a disk drive unit.

8. An image data processing terminal equipment as claimed in claim 1 wherein said external device comprises a host computer.

9. An image data processing terminal equipment as claimed in claim 1:

wherein said data processing means comprises means for deriving video data from the data produced and output by said external device, said video data being written into said memory means; and said image data processing terminal equipment comprises print means for printing an image formed by said video data stored in said memory means on a recording media.

10. An image data processing terminal equipment as claimed in claim 9, wherein said image data processing terminal equipment is a printer.

11. An image data processing terminal equipment as claimed in claim 9, wherein:

said data processing means comprises means for compressing data supplied from said external device and for generating compressed data; and said compressed data is supplied to said external device through said communication means.

12. An image data processing terminal equipment coupled to an external device, said image data processing terminal equipment comprising:

communication means for transferring data between said data processing terminal equipment and said external device;

data processing means, coupled to said communication means, for generating video data from said data supplied from said external device through said communication means;

memory means, coupled to said data processing means and said communication means, for storing said video data;

data writing means, coupled to said communication means and said data processing means, for writing said video data generated and output by said data processing means into said memory means;

data read out means, coupled to said communication means and said memory means, for reading out said video data from said memory means and for supplying said image data to said external device through said communication means;

print means, coupled to said memory means, for printing an image formed by said video data on a recording media; and control means, coupled to said data processing means, said data communication means, said memory means and said print means, for receiving a command produced and output by said external device and for selectively connecting said external device to either said memory means, said print means or said communication means in accordance with said command.

13. An image data processing terminal equipment as claimed in claim 12 wherein, when said control means connects said external device to said communication means, said video data is sent to said external device through said communication means.

14. An image data processing terminal equipment as claimed in claim 12, wherein said data writing means writes said video data into said memory means in accordance with a write command produced and output by said external device and said data read out means reads out said video data from said memory means in accordance with a read command produced and output by said external device, and wherein said image data processing terminal equipment further comprises:

area reserving means, coupled to said communication means and said memory means, for receiving a first command produced and output by said external device through said communication means to directly request the memory means to reserve a storage area of said memory means and for reserving said storage area of said memory means in response to said first command; and area releasing means, coupled to said communication means and said memory means, for receiving a second command produced and output by said external device through said communication means to directly request the memory means to release said storage area of said memory means and for releasing said storage area of said memory means in response to said second command, wherein said data writing means writes said data into said storage area of said memory means reserved by said area reserving means.

15. An image data processing terminal equipment as claimed in claim 14, wherein when said control means connects said external device to said communication means, said video data is sent to said external device through said communication means.

16. A method of operating an external device for a data processing terminal equipment comprising the steps of:

transferring data between said data processing terminal equipment and said external device;

writing data supplied from said external device into memory means in accordance with a write command produced and output by said external device;

reading out said data supplied from said external device from said memory means and supplying said data to said external device in accordance with a read command produced and output by said external device;

receiving a first command produced and output by said external device, said first command requesting the memory means to directly reserve a storage area of said memory means so that said external device can secure the storage area of the memory means for independent use;

reserving said storage area of said memory means in response to said first command;

receiving a second command produced and output by said external device, said second command requesting the memory means to directly release said storage area of said memory means;

releasing said storage area of said memory means in response to said second command; and writing said data into said storage area of said memory means reserved by said area reserving means in response to said first command.

* * * * *